United States Patent [19]

Asperger

[11] 4,360,547
[45] Nov. 23, 1982

[54] SELECTIVE SCALE FORMATION

[75] Inventor: Robert G. Asperger, Bartlesville, Okla.

[73] Assignee: Phillips Petroleum Company, Bartlesville, Okla.

[21] Appl. No.: 196,962

[22] Filed: Oct. 14, 1980

[51] Int. Cl.³ .......................... B05D 1/18; H02K 7/18; C02B 5/06
[52] U.S. Cl. .................................. 427/435; 60/641.3; 210/702; 252/180; 252/181; 252/82; 290/2; 290/52; 418/100; 418/201
[58] Field of Search .................... 418/100, 201; 290/2, 290/52; 252/175, 82, 180, 181; 427/435; 60/641.3; 210/702

[56] References Cited
U.S. PATENT DOCUMENTS

| | | | |
|---|---|---|---|
| 3,470,112 | 9/1969 | Irani et al. | 260/2 |
| 3,718,603 | 2/1973 | Mitchell | 252/389 |
| 3,751,673 | 8/1973 | Sprankle | 290/52 |
| 3,806,459 | 4/1974 | Petrey | 252/82 |
| 3,811,806 | 5/1974 | King | 418/100 |
| 3,977,818 | 8/1976 | Sprankle | 418/201 |
| 3,988,253 | 10/1976 | Tate | 252/82 |
| 4,155,869 | 5/1979 | Durham | 252/180 |
| 4,166,041 | 8/1979 | Goodman | 252/180 |

OTHER PUBLICATIONS

R. A. McKay, "The Helical Screw Expander Evaluation Project", 12th Intersociety Energy Conversion Engineering Conference, (12th IECEC), Washington, D.C., 1977.

Primary Examiner—Michael R. Lusignan

[57] ABSTRACT

A fluid stream is treated with at least one scale inducing agent prior to being passed through an engine having sweeping elements which limit the thickness of scale deposits therein to improve the efficiency with which the engine utilizes the energy contained within the fluid stream.

41 Claims, 1 Drawing Figure

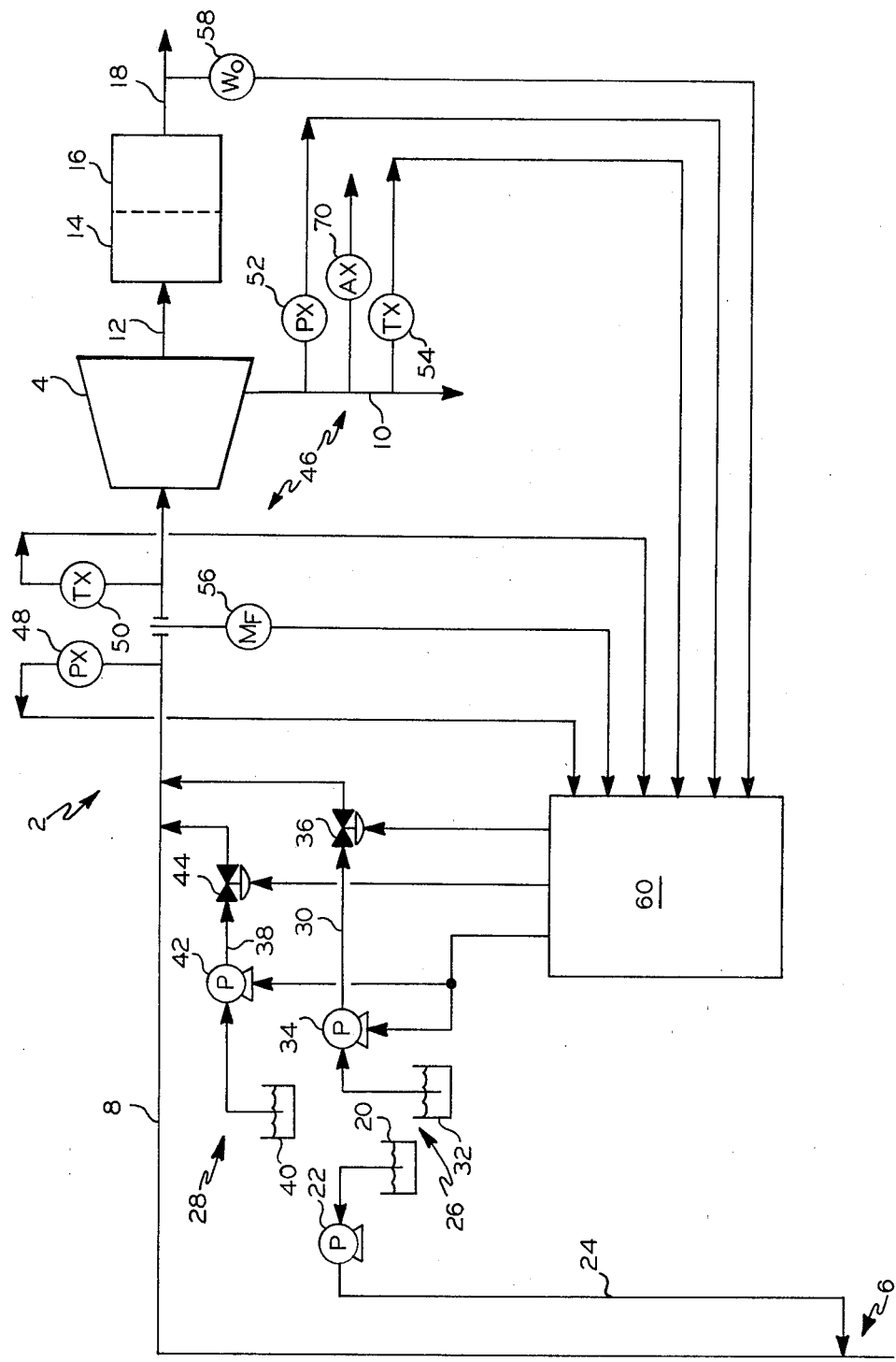

SELECTIVE SCALE FORMATION

BACKGROUND OF THE INVENTION

The invention relates to causing scale formation. In another aspect, the invention relates to causing selective scale formation along a portion of a path of a fluid stream.

In yet another aspect, the invention relates to causing scale formation in a screw expander utilizing a geothermally heated fluid as a power source.

Power can be generated from geothermally heated water and steam by utilizing, for example, plural rotor helical screw expanders such as disclosed in U.S. Pat. Nos. 3,751,673 and 3,977,818. Such devices operate well with geothermal sources which deliver a major portion of their energy as superheated water, much of which is hot brine laden with dissolved minerals. The dissolved mineral concentration of geothermal brines is high because of their in situ elevated temperature and pressure and tends to be at or near chemical saturation because of the long residence of the water in the mineral deposit. In the utilization of geothermal energy, the dissolved minerals in the product brines result in considerable problems associated with scale formation in all utilization equipment associated therewith.

When the brines are released from their geothermal source, the pressure and temperature are reduced and frequently there is an immediate precipitation of minerals. The amount of precipitate is frequently so great as to clog up and disable such utilization systems in a very short period, unless preventive measures are taken.

Helical screw expanders, in operation, continuously rid themselves of deleterious precipitated minerals. The minerals which do remain actually improve the efficiency of the expander by forming a seal between its moving surfaces, as well as reducing the possibility of corrosion attacking the internal expander surfaces. It is thus desirable to have scale deposits in helical screw expanders.

However, geothermal well fluids undergo a reduction in temperature and pressure as they are withdrawn from the well. The spontaneous deposition of minerals which can occur in the downhole piping string can completely clog up communication between the geothermal source and the screw expander in a short period. In order to bring the downhole piping string back on line, it is necessary to remove the offending deposit, at considerable expense and loss of time. To overcome the problems of downhole scaling, scale inhibiting compounds are injected at the bottom of the piping string. By regulating the amount of scale inhibiting compound admixed with the upwardly flowing fluid, it is possible to substantially prevent scale deposition in the downhole string. Scale deposition between the wellhead and the expander is normally not a problem, because the well fluids are at a substantially constant temperature and pressure along this portion of their path length.

A problem in utilizing well fluid which contains scale inhibiting compositions, or well fluids not containing high concentrations of dissolved minerals, is that deposition of minerals between the mating surfaces of the screw expander does not occur. It would thus be desirable when utilizing such geothermal sources as the motive fluid for an engine to provide for selective scale deposition in the engine to improve its efficiency.

OBJECTS OF THE INVENTION

It is thus an object of this invention to cause selective deposition of scale in an engine which continuously rids itself of deleterious precipitated minerals, thereby improving its efficiency and corrosion resistance.

SUMMARY OF THE INVENTION

Accordinng to one aspect of the present invention, a fluid stream to be passed through an engine having sweeping elements which limit the thickness of deposition of materials from the stream between the sweeping elements of the engine is treated with at least one scale inducing agent so as to cause deposition of scale between the sweeping elements of the engine.

According to another aspect of the present invention, a fluid stream which has been previously treated with a scale inhibiting agent is treated with a scale inducing agent prior to its passage through a screw expander.

According to another aspect of the present invention, the addition rate at which a scale inducing agent is added to a helical screw expander is regulated responsively to the efficiency at which the expander is operating.

According to another aspect of the present invention, a stream of geothermally heated fluid is passed through a helical screw expander, a signal representative of the expander efficiency is generated, and at least one scale inducing agent is added to the fluid stream upstream of the expander to cause a deposition of scale in the expander to result in a change in the signal from a first value to a second value.

According to another aspect of the present invention, an apparatus comprising a helical screw expander and a means for conveying a geothermally heated fluid stream from a geothermal source to the screw expander is improved by the addition thereto of a means for introducing a scale inducing agent into the fluid stream upstream of the screw expander.

BRIEF DESCRIPTION OF THE FIGURE

The FIGURE is a schematic illustration setting forth certain features of the present invention.

DETAILED DESCRIPTION OF THE INVENTION

As shown in the FIGURE, a geothermally driven electrical power system 2 comprises an engine 4 operatively connected to a geothermal source 6 by a means for conveying a geothermally heated fluid stream such as conduit 8. An exhaust conduit 10 withdraws spent fluid from the engine 4 for proper and safe disposal, such as reinjection into the geothermal source. A mechanical output 12 from the engine 4 is operatively engaged with reduction gearing 14 cooperating with an electrical generator 16. An electrical output 18 from the generator 16 is tied into an electrical network (not shown).

The geothermal source 6 is preferably a source of dry steam. Less preferably, the geothermal source 6 is a source of saturated steam and hot water. However, as is usually the case, the geothermal source 6 is a source of saturated steam and hot brine, at a sufficient wellhead temperature and pressure to drive the engine 4, for example, a temperature of from about 212° F. to about 705° F. and a pressure of from about 14 psig to about 3200 psig. Typically, the geothermal stream contains hot water soluble salts having cations selected from the group consisting of magnesium, beryllium calcium, strontium, barium, lithium, rubidium, cesium, titanium, aluminum, nitronium, sulfonium, phosphonium, and iron, as well as potassium and sodium. Usually, the fluid stream comprises at least Group IA and Group IIA metal cations, although some brines contain lead, silver and other heavy metals such as chromium, iron, arsenic, antimony, bismuth, tin, calcium, nickel, copper and zinc as well. These metals can precipitate as sulfides, for example, AgS and $Cu_2S$ at the surface. The concentrations of these materials on an elemental basis can range from about 1 ppm or less to upwards of 50,000 ppm or more. As used herein, the terms "ppm", or "parts per million" refers to the weight of the specified material present in one million parts by weight of the specified material and other materials associated with the specified material. The fluid from the geothermal source frequently contains anions selected from the group consisting of halide, hydroxide, bicarbonate, carbonate, sulfate, borate, aluminate, silicate, nitrate sulfide and phosphate. Of the numerous salts which can be found in the fluid from the geothermal source, calcium bicarbonate is one of the most ubiquitous and troublesome. As pressure is released on hot calcium bicarbonate solution, carbon dioxide is flashed and calcium carbonate precipitated. Flashing of the carbon dioxide raises the pH of the fluid, favoring the formation of the precipitate, which is a notorious scale former.

The engine 4 is of a type which continuously rids itself of deleterious deposits of scale. Normally, sweeping elements in the engine limit the thickness of deposition of scale from the stream. Scale deposits which do occur do not normally decrease the efficiency of the engine. A helical screw expander, preferably an intermeshing plural rotor helical screw expander as shown in U.S. Pat. No. 3,751,673, issued Aug. 7, 1973 to Roger S. Sprankle, can be employed as the engine 4.

Exhaust from the engine 4 is conveyed via conduit 10 to a place of safe disposal, such as an injector well.

Should lines 8 or 10 become restricted or shut off by mineral deposits, it is sometimes possible to reduce or eliminate the offending deposits by acid treatment of the fluid stream. The acid selected should be one which does not form precipitates with other materials contained within the fluid stream or render the fluid stream unfit for safe disposal, such as by injection. Hydrochloric acid and/or carbonic acid are suitable for this use.

When utilizing steam saturated brine as the geothermal source, anti-scalants can be injected downhole to prevent or mitigate scale deposits in conduit 8. A solution of anti-scalant at a suitable concentration in a vessel 20 is injected via conduit 24 downhole near the end of conduit 8 by a pump 22 in conduit 24.

Generally, water-soluble organic compounds having phosphate groups can be employed as scale inhibiting agents. Exemplary of suitable scale inhibiting agents are compounds represented by the formula:

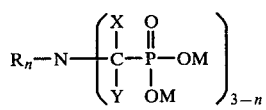

wherein n is an integer of from 0 to 2, X and Y are independently selected from the group consisting of hydrogen and hydrocarbyl having from 1 to about 6 carbon atoms, each M is independently selected from the group consisting of hydrogen and cations which cause water solubility of the scale inhibiting agent, and $R_n$ contains 6 or fewer nitrogen atoms and is selected from the group consisting of hydrogen, aliphatic, aryl, alkaryl, arakyl, alicyclic and:

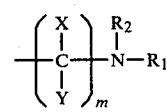

wherein m is an integer of from 1 to 10, and $R_1$, and $R_2$ are individually selected from the group consisting of hydrogen, alkyl groups containing from 1 to 6 carbon atoms,

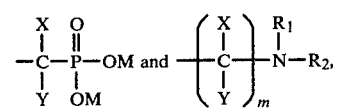

Particularly preferred scale inhibiting agents are represented by the formulas:

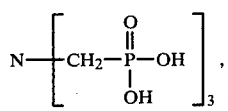

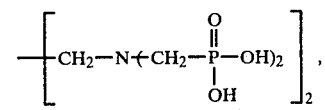

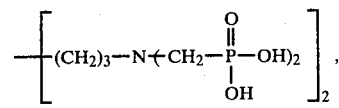

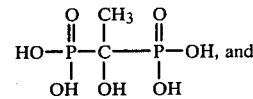

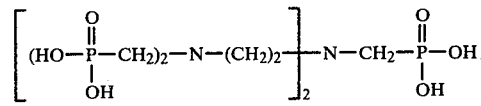

Additionally, water-soluble compounds represented by the formulas:

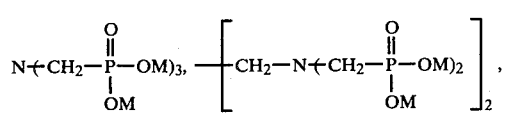

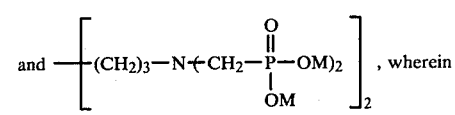, wherein

M is a cation selected from the group consisting of $NH_4^+$, $K^+$, $Li^+$, $(CH_3)_2NH_2^+$, $CH_3NH_3^+$, $Cs^+$, $Na^+$, $Rb^+$, and $\frac{1}{2} Mg^{++}$, preferably, from group IA metals can be employed. Most preferably, the scale inhibiting agent employed is diethylenetriamine penta(methylenephosphonic acid) which is represented by the formula:

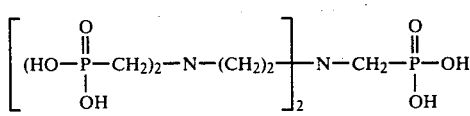

because it has been used with good results. This material is available from Monsanto Company, St. Louis, Mo. under the tradename Dequest 2060.

Scale inhibiting compounds as set forth above are injected downhole into the conduit 8 via conduit 24 in amounts preferably effective to substantially prevent scale deposits from occurring in the conduit 8. Typically, the scale inhibiting agent is injected into the conduit 8 in amounts so as to impart to the fluid stream a concentration of scale inhibitor ranging from about 0.1 to about 2.5 ppm. The rate at which scale inhibiting compound is injected into the conduit 8 can be regulated by manipulating the speed of pump 22 or the concentration of scale inhibiting compound contained in vessel 20. Normally, an aqueous solution of scale inhibiting agent is present in the vessel 20.

Excessive amounts of scale inhibiting agent are ineffective to prevent scale deposition in the conduit 8. It is thus advisable to experimentally determine the effects of particular concentrations of particular scale inducing agents for the particular water chemistry likely to be encountered for the geothermal source considered before commercial employment.

In accordance with the present invention, at least one scale inducing agent is injected into the fluid stream preferably immediately upstream of the engine 4. If desired, one or more scale-forming precursors can be injected into the fluid stream as well, to control the characteristics of the scale formed in the engine 4. Thus, as shown in the FIGURE, the apparatus of the invention is provided with a means 26 for introducing a scale-inducing agent into the fluid stream, and, optionally, depending upon the chemistry of the fluid stream, at least one means 28 for introducing a scale-forming precursor into the fluid stream carried by conduit 8.

As illustrated, the means 26 comprises a conduit 30 which establishes communication between the fluid stream 8 and a vessel 32. The conduit 30 empties into the fluid stream at a position upstream of the expander 4. Preferably, the conduit 30 empties into the fluid stream at a position closely adjacent the upstream end of the engine 4, to prevent undesirable scale deposition in the conduit 8. However, if necessary, a scale inducing agent can be introduced into the fluid stream at positions along the housing of the engine 4, to insure gap closure between the sweeping elements of the engine along their full length. A means 34 for pumping a fluid from the container 32 and through the conduit 30 is provided in the conduit 30 intermediate vessel 32 and the fluid stream 8. Desirably, a means for controlling fluid flow through the conduit 30, such as a valve 36 is also provided in the conduit 30.

Generally, the vessel 32 contains an aqueous solution of a suitable scale inducing agent which contains cations and/or anions which react with at least one component contained within the fluid stream so as to form a scale. Preferably, the scale-inducing agent is selected so that its active components react quickly with components of the fluid stream to form a scale which adheres substantially only to the inside surfaces of the expander 4. It is thus desirable that the scale forming reaction be substantially complete within a time period equal to the residence time of the fluid stream in the engine 4, usually less than one second.

Generally, the aqueous solution of scale inducing agent contained in the vessel 32 comprises at least one cation selected from the group consisting of magnesium, calcium, strontium, barium, lithium, rubidium, cesium, titanium, aluminum, nitronium, sulfonium, phosphonium and iron. If desired, the aqueous solution of scale inducing agent can contain reactive anions selected from the group consisting of carbonate, hydroxide, bicarbonate, sulfate, borate, aluminate, silicate, nitrate and phosphate group containing anions, preferably, to react with at least a portion of the Group IA and IIA metal cations in the fluid stream. As an alternative, the aqueous solution of scale-inducing agent can comprise the same types of materials which are employed downhole as the scale-inhibiting agent. For example, the organic materials containing phosphate groups earlier described as suitable scale-inhibiting agents can be added to the fluid stream in excess amounts to form an adhering precipitate, or scale. Particularly preferred scale inducing agents comprise aqueous solutions of the chlorides, bromides, and iodides of calcium, barium, strontium, iron, magnesium, and lithium. The sodium phosphates and bicarbonates can be used as well. As used herein, the chlorides, bromides and iodides of the above-listed metal cation-containing scale inducing agents are intended to include the various hydrates of such materials as well. Because of cost, calcium chloride is the preferred material. Most preferred are anhydrous calcium chloride and its mono-, di- or hexahydrates because they have been employed with good results. When injecting calcium chloride into the fluid stream, the scale which is formed preferably contains substantial amounts of calcium carbonate. The scale deposits which are present in the engine thus preferably contain calcium. Depending upon the type of scale desired in the engine 4, and the particular water chemistry involved, the scale deposits formed in the engine can also contain carbonates, sulfates, sulfides, borates, aluminates, silicates, and/or phosphates as well.

Generally, the scale inducing agent is introduced into the fluid stream in a sufficient amount so as to impart to the fluid stream a concentration of scale inducing agent which will form a desirable amount of scale in the engine 4. The lower effective limit at which a scale inducing agent can be added is dictated by the sealing needs of the engine 4, while the upper limit as to the amount which can be added is dictated by economics and the capacity of the engine 4 to eliminate excessive scale. By excessive scale is meant an amount of scale which harms the performance of the engine 4, that is, an amount which reduces its efficiency due to excessive power consumption in shearing and eliminating scale. Depending on the particular scale inducing agent selected, a concentration of scale inducing agent in the fluid stream of between about 0.01 and about 100,000 ppm by weight is operative. Generally, the concentration of a scale inducing agent in the fluid stream is sufficient to impart to the fluid stream a concentration of scale inducing agent of between about 0.1 and about 1,000 ppm by weight. Preferably, a sufficient amount of scale inducing agent is introduced into the fluid stream so as to impart to the fluid stream a concentration of scale inducing agent of between about 1 and about 50 ppm by weight, because such a concentration within such a range has been employed with good results. It is believed that most any water-soluble calcium compound, for example, calcium acetate, can be employed as a scale inducing agent at such concentration with good results.

If desired or necessary because of the particular geothermal source chemistry, the fluid stream can additionally be treated with at least one scale-forming precursor in addition to being treated with a scale inducing agent. In this embodiment, a scale forming reaction occurs between at least one component of the scale inducing agent and at least one component of the scale-forming precursor. The type of scale formed in the engine 4 can be thus controlled. It is believed that this embodiment has particular applicability to geothermal sources which emit dry steam, as the scale inducing agent and scale-forming precursor can be admitted into the fluid stream to cause desirable depositions of scale in the engine 4.

As shown, the means 28 for introducing at least one scale-forming precursor into the fluid stream comprises a conduit 38 establishing communication between the fluid stream and a vessel 40. As in the means 26, the means 28 can also be provided with a pump 42 and a valve 44 to regulate the amount of scale-forming precursor which is introduced into the fluid stream. The conduit 38 can empty into the fluid stream at any position upstream of the engine 4, if the scale-forming precursor is selected so as not to react with components already present in the fluid stream so as to form a scale. In this embodiment, one or the other of the scale-forming precursor and scale inducing agent comprises an anion, and the other comprises a cation, the cation and anion being selected so as to react when both are present in the fluid stream and form a scale. For example, one of the scale-forming precursor and scale inducing agent in this embodiment contains cations selected from the group consisting of magnesium, calcium, strontium, barium, lithium, rubidium, cesium, titanium, aluminum, nitronium, sulfonium, phosphonium and iron, and the other contains anions selected from the group consisting of carbonate, bicarbonate, hydroxide, sulfate, sulfide, borate, aluminate, silicate, nitrate, and phosphate group containing anions. The ratio between the rate at which scale-forming precursor and scale inducing agent are added to the fluid stream can be varied to achieve best results. Highly water-soluble salts are preferred for ease of handling and metering.

Further, according to the invention, the addition rate of the scale inducing agent to a helical screw expander is regulated responsively to the efficiency at which the expander is operating. In this embodiment, a signal representative of the enthalpy lost by the fluid stream as it passes through the screw expander is compared to a signal representative of the electrical power produced by generator 16. From these two signals, a signal representative of the efficiency at which the expander utilizes the geothermally heated fluid is generated, and the at least one scale inducing agent is introduced into the fluid stream upstream of the expander to cause a deposition of scale in the expander and a change in the efficiency signal from a first value to a second value representative of a higher efficiency. In another aspect, the addition rate of scale inducing agent is increased responsively to a decrease in the signal representative of engine efficiency.

Referring to the FIGURE, a means 46 for providing input to generate a signal representative of the enthalpy loss of the fluid stream as it passes through engine 4 is provided. As illustrated, the conduit 8 is provided with an upstream pressure monitor 48, and an upstream temperature monitor 50. The downstream conduit 10 is provided with a downstream pressure monitor 52 and a downstream temperature monitor 54. A mass flow monitor 56 is provided either upstream or downstream of the engine 4. By utilizing such devices it is possible to ascertain the pressure loss, temperature loss, and mass flow rate of the fluid passing through the engine 4 and produce a signal representative of the power loss of the fluid stream as it passes through the engine 4. The signal representative of power loss is compared with a signal representative of power output from the engine. Although the mechanical output 12 from the engine 4 can be provided with a suitable power monitor, it is preferred, for convenience, to employ an electrical power monitor 58 on the electrical output 18 from the generator 16. The devices 48, 50, 52, 54, 56 and 58 provide signals which are fed to a calculating device 60 which establishes a signal representative of expander efficiency. The efficiency, $\eta$, of the expander and related power generating equipment is given by the equation:

$$\eta \frac{P}{m(h_1 - h_2)}$$

where P is the electrical power measured by device 58, m is the mass flow rate measured by the device 56, $h_1$ is inlet enthalpy of the fluid stream and $h_2$ is the outlet enthalpy of the fluid stream. A signal representative of expander efficiency is provided by comparing the signal representative of power produced to a signal representative of enthalpy lost which can be provided from the denominator and inputs from devices 48, 50, 52, 54 and 56 and saturated steam tables. The approximation, while inexact because the fluid stream usually comprises an imperfect 3 phase system, allows information to be obtained as to whether the efficiency at which the expander is operating has increased or decreased. A suitable calculating device 60 is an Optrol 7000 series Process Computer System available from Applied Automation, Inc., Bartlesville, Okla.

According to another aspect of the present invention, a helical screw expander utilizing a geothermally heated brine for a power source is brought on line as follows. Scale-inhibiting agent from vessel 20 is introduced into conduit 8 adjacent the bottom of the borehole via conduit 24. Fluid is caused to flow through the engine 4, resulting in the generation of electrical power at line 18. Inlet temperature and pressure of the fluid stream is monitored by devices 48 and 50 and appropriate signals provided to the device 60. Outlet temperature and pressure conditions of the fluid stream are monitored by the devices 52 and 54, which provide appropriate signals to the device 60. The mass flow rate of the fluid stream is monitored by the device 56 which provides an appropriate signal to the device 60. Since scale adherence in the inside of the engine 4 is inhibited by the presence of the scale inhibiting compositions in the fluid stream, the efficiency of the engine 4 is relatively low. Additionally, the possibility of corrosion attacking the inside bare metal surfaces of the engine 4 is relatively high. In order to cause an adequate deposition of scale on the inside surfaces of the expander 4 to increase engine efficiency and reduce the possibility of corrosion, pump 34 is activated and scale inducing agent is introduced into the fluid stream via line 30. If necessary, pump 42 is also actuated and scale-forming precursor is introduced into the fluid stream at an appropriate ratio with respect to the amount of scale-inducing agent. If desired, pumps 34 and 42 can be wired in parallel as shown. Scale begins to form and adhere to the inside surfaces of the engine 4.

It is useful to perform a totals analysis on the exhaust fluid from the engine 4 as indicated by 70, to better ascertain the achievement of equilibrium conditions in the engine 4 with respect to the adherence and elimination of scale in the engine 4. Where a single scale-inducing agent is employed, the concentration of the component in line 8 which reacts with the scale-inducing agent to form scale will be lowered in the line 10 for that period of time during which more scale is adhering within than is eliminated by the expander. When equilibrium conditions are reached, the total amount of the material in the fluid stream which reacts with the scale-inducing agent to form scale will be the same in each of lines 8 and 10, although it may have changed from soluble to insoluble form. Alternatively, totals analyzer 70 can be employed to analyze for concentration of scale-inducing agent. While scale is being formed and adhering in the engine at a faster rate than it is being eliminated from the engine, the concentration of the scale-inducing agent in line 10 will be lower than it is in line 8 at the entrance to the engine 4. This embodiment is preferred where both of a scale-inducing agent and scale-forming precursor are employed to form scale in the expander 4. Concomitantly with the solids analysis, electrical power is generated and measured by the device 58 and an appropriate signal relayed to the computer 60. As the engine is brought up to "maximum" efficiency, the totals analysis should approach equilibrium conditions. When the expander is operating at substantially maximum efficiency, a set point can be selected corresponding to a value representative of maximum efficiency and programmed as a preselected signal into the computer 60. Pump 34 can then be deactivated to avoid wasting scale-inducing agent and valve 36 closed or line 30 provided with a check valve to prevent backflow of fluid through line 30. In operation, whenever the signal representative of the efficiency of the engine falls below the preselected signal, or to a predetermined value below the preselected signal, pums 34 and optionally 42 are actuated and scale deposited in the engine 4 until the efficiency of the engine 4 is again substantially maximized, as indicated by the signal representative of engine efficiency approaching the preselected signal. Alternatively, pumps 34 and optionally 42 can run continuously and valves 36 and 44 moved from first settings to second settings responsively to a relationship between the signal representative of the efficiency of the engine and the preselected signal. For example, valves 34 and 42 can be open if the difference between the signals is more than a predetermined valve and closed if the difference is less than a predetermined value.

While the invention has been described in terms of the presently preferred embodiment, reasonable variations and modifications are possible by those skilled in the art, within the scope of the described invention and the appended claims.

That which is claimed is:

1. A process comprising:

treating a fluid stream to be passed through an engine having sweeping elements which limit the thickness of depositions of materials from the stream between the sweeping elements of the engine with at least one scale inducing agent so as to cause deposition of scale between the sweeping elements of the engine.

2. A process as in claim 1 wherein the fluid stream is comprised of heated brine and saturated steam.

3. A process as in claim 2 wherein said fluid stream is from a geothermal source.

4. A process as in claim 3 wherein said stream is treated with said at least one scale inducing agent prior to passing said fluid stream through said engine.

5. A process as in claim 4 further comprising treating said stream with at least one scale forming precursor prior to treating said stream with said scale inducing agent.

6. A process as in claim 4 wherein said stream contains at least one anion selected from the group consisting of carbonate, hydroxide, bicarbonate, sulfate, sulfide, borate, aluminate, silicate, nitrate and phosphate group containing anions and said scale inducing agent comprises a solution containing at least one cation selected from the group consisting of magnesium, silver, palladium, copper, nickel, zinc, arsenic, antimony, bismuth, tin, chromium, iron, cobalt, calcium, strontium, barium, lithium, rubidium, cesium, titanium, aluminum, nitronium, sulfonium, phosphonium and iron.

7. A process as in claim 4 wherein said stream contains at least one cation selected from the group consisting of magnesium, calcium, strontium, silver, palladium, copper, nickel, zinc, arsenic, antimony, bismuth, tin, chromium, iron, cobalt, barium, lithium, rubidium, cesium, titanium, aluminum, nitronium, sulfonium, phosphonium and iron and said scale inducing agent comprises a solution containing at least one anion selected from the group consisting of carbonate, hydroxide, bicarbonate, sulfate, sulfide, borate, aluminate, silicate, nitrate and phosphate group containing anions.

8. A process as in claim 5 wherein one of said scale forming precursor and scale inducing agent contains cations selected from the group consisting of magnesium, calcium, strontium, barium, lithium, rubidium, silver, palladium, copper, nickel, zinc, arsenic, antimony, bismuth, tin, chromium, iron, cobalt, cesium, titanium, aluminum, nitronium, sulfonium, phosphonium and iron and the other contains anions selected from the group consisting of carbonate, bicarbonate, hydroxide, sulfate, sulfide, borate, aluminate, silicate, nitrate and phosphate containing anions.

9. A process as in claim 4 wherein scale deposits containing calcium are formed in said engine.

10. A process as in claim 9 wherein the scale deposits formed in the engine also contain carbonates, sulfates, borates, aluminates, silicates sulfides and/or phosphates.

11. In a process comprising:

(a) providing a stream of geothermally heated fluid;
    (b) treating said stream with a scale inhibiting amount of a scale inhibiting agent to at least mitigate scale formation by the stream;
    (c) passing said stream through an intermeshing plural rotor helical screw expander to cause rotation of an output shaft of said screw expander, said expander being designed to limit scale buildup within by the sweeping action of its plural rotors; the improvement comprising:

(d) injecting a sufficient amount of at least one scale inducing agent into said stream to cause deposition of scale in said screw expander whereby scale is deposited in said screw expander.

12. A process as in claim 11 wherein said scale inhibiting agent is represented by the formula:

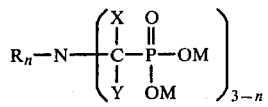

wherein n is an integer of from 0 to 2, X and Y are independently selected from the group consisting of hydrogen and hydrocarbyl having from 1 to about 6 carbon atoms, each M is indpendently selected from the group consisting of hydrogen and cations which cause water solubility of the scale inhibiting agent, and $R_n$ contains 6 or fewer nitrogen atoms and is selected from the group consisting of hydrogen, aliphatic, aryl, alkaryl, arakyl, alicyclic and:

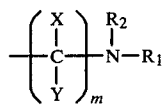

wherein m is an integer of from 1 to 10, and $R_1$ and $R_2$ are individually selected from the group consisting of hydrogen, alkyl groups containing from 1 to 6 carbon atoms,

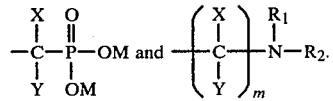

13. A process as in claim 11 wherein said scale inhibiting agent is selected from the group consisting of:

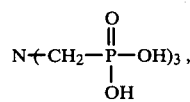

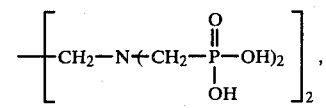

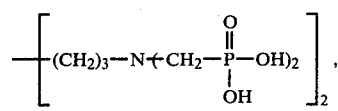

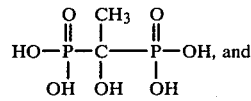

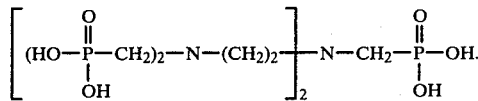

14. A process as in claim 11 wherein said scale inhibiting agent is a water soluble compound selected from the group consisting of:

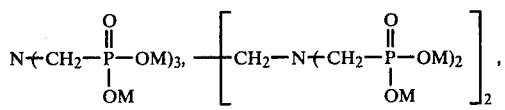

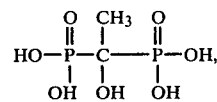

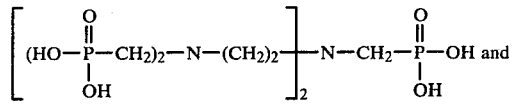

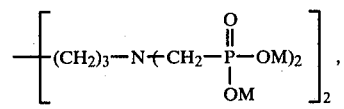

wherein M is selected from the group of cations consisting of $NH_4^+$, $K^+$, $Li^+$, $Na^+$, $Rb^+$, $Ce^+$ and $Mg^{++}$.

15. A process as in claim 13 wherein said at least one scale inducing agent comprises a water soluble salt of a group IA metal.

16. A process as in claim 13 wherein the geothermally heated fluid stream contains at least one water soluble salt containing at least one metal cation selected from group IA and IIA metal cations and wherein said at least one scale inducing agent comprises a water soluble salt having an anionic portion which forms a precipitate with at least a portion of the group IA and group IIA metal cations in the stream.

17. A process as in claim 16 wherein the scale inducing agent is represented by the formula:

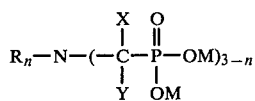

wherein n is an integer of from 0 to 2, X and Y are independently selected from the group consisting of hydrogen and hydrocarbyl having from 1 to about 6 carbon atoms, each M is independently selected from the group consisting of hydrogen and cations which cause water solubility of the scale inhibiting agent, and $R_n$ contains 6 or fewer nitrogen atoms and is selected from the group consisting of hydrogen, aliphatic, aryl, alkaryl, arakyl, alicyclic and

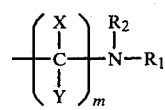

wherein m is an integer of from 1 to 10, and $R_1$ and $R_2$ are individually selected from the group consisting of hydrogen, alkyl groups containing from 1 to 6 carbon atoms,

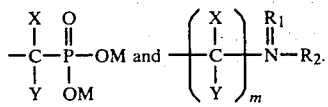

18. A process as in claim 13 wherein the scale inhibiting agent and the scale inducing agent comprise the same compound.

19. A process as in claim 15 wherein the scale inducing agent is injected into said stream immediately prior to passing the stream through the screw expander.

20. A process as in claim 19 wherein the scale inducing agent is selected from the group consisting of calcium chloride and its hydrates, calcium bromide and its hydrates, calcium iodide and its hydrates, calcium bicarbonate, calcium acetate and calcium nitrate.

21. A method comprising regulating the addition rate of a scale forming agent to a helical screw expander responsively to the efficiency at which the expander is operating.

22. A method as in claim 21 wherein a heated fluid containing said scale inducing agent is passed through said screw expander thereby losing a position of its enthalpy and a mechanical output from said screw expander is employed to generate electrical power.

23. A method as in claim 22 wherein the efficiency at which the expander is operating is calculated from the electrical power generated from the expander output and the pressure loss, temperature loss, and mass flow rate of the heated fluid passing through the expander.

24. A method as in claim 23 wherein the addition rate of scale forming agent is increased responsively to a decrease in expander efficiency.

25. A method as in claim 24 further comprising monitoring the heated fluid passing from the screw expander for scale products and adjusting the addition rate of scale forming agent to reduce the amount of scale products in the fluid passing from the screw expander.

26. A method comprising:
(a) passing a stream of geothermally heated fluid through a plural rotor helical screw expander;
(b) generating a signal representative of the efficiency at which the expander utilizes the geothermally heated fluid;
(c) introducing at least one scale inducing agent into the fluid stream upstream of the expander to cause the deposition of scale in the expander and a change in the signal from a first value representative of a first efficiency to a second value representative of a second efficiency.

27. A method as in claim 26 wherein the signal at the first value is representative of the efficiency of the expander when it contains substantially no scale deposits and wherein the signal at the second value is representative of the efficiency of the expander when it contains optimal amounts of scale deposits.

28. A method as in claim 26 wherein the signal at the first value is representative of the efficiency of the expander when it contains less than optimal amounts of scale deposits and wherein the signal at the second value is representative of the efficiency of the expander when it contains optimal amounts of scale deposits.

29. A method as in claim 28 wherein the stream of geothermally heated fluid contains a scale inhibiting agent.

30. A method as in claim 29 wherein the second value is preselected and the first value is at a predetermined value below the second value.

31. A method as in claim 30 wherein the stream of geothermally heated fluid contains calcium ion at a concentration of between 1 and 50,000 parts per million by weight.

32. A method as in claim 30 wherein the stream of geothermally heated fluid contains calcium ion at a concentration of between about 5 and about 50 parts per million by weight.

33. A method as in claim 30 wherein the scale inducing agent is introduced into the stream of geothermally heated fluid so as to impart to the stream of geothermally heated fluid a concentration of scale forming agent of between about 0.01 and about 100,000 parts per million by weight.

34. A method as in claim 30 wherein the scale inducing agent is introduced into the stream of geothermally heated fluid so as to impart to the stream of geothermally heated fluid a concentration of scale inducing agent of between about 0.1 to about 1,000 parts per million by weight.

35. A method as in claim 32 wherein the scale inducing agent is introduced into the stream of geothermally heated fluid so as to impart to the stream of geothermally heated fluid a concentration of scale inducing agent between about 1 and 50 parts per million by weight.

36. A method as in claim 34 wherein the scale inducing agent comprises a water soluble calcium compound.

37. In an apparatus comprising:
(a) an intermeshing plural rotor helical screw expander, and
(b) means for conveying a geothermally heated fluid stream from a geothermal source to the screw expander;
the improvement comprising:
(a) a container;
(b) a conduit establishing communication between the container and a point in the means for conveying a geothermally heated fluid stream which is immediately upstream of the screw expander; and
(c) means for pumping a fluid from the container and through the conduit.

38. Apparatus as in claim 37 further comprising a meanns cooperating with the conduit for controlling fluid flow through the conduit.

39. Apparatus as in claim 38 further comprising:
(a) a second container;
(b) a second conduit establishing communication between the container and a point in the means for conveying a geothermally heated fluid stream which is upstream of the screw expander;
(c) means for pumping a fluid from the second container and through the second conduit; and
(d) a means cooperating with the second conduit for controlling fluid flow through the second conduit.

40. In an apparatus comprising:
(a) an intermeshing plural rotor helical screw expander; and
(b) means for conveying a geothermally heated fluid stream from a geothermal source to the screw expander;
the improvement comprising:
a means for injecting at least one scale inducing agent into said fluid stream immediately upstream of said screw expander.

41. Apparatus as in claim 40 further comprising:
  a means for establishing a signal representative of the operating efficiency of the expander; and
  a means cooperating with the means for injecting at least one scale inducing agent for controlling the rate of injection of scale inducing agent in response to said signal being representative of an efficiency lower than a preselected maximum efficiency.

* * * * *